United States Patent
Li et al.

(10) Patent No.: US 9,134,921 B1
(45) Date of Patent: Sep. 15, 2015

(54) UNIQUELY NAMING STORAGE DEVICES IN A GLOBAL STORAGE ENVIRONMENT

(75) Inventors: Dongfeng Li, Sunnyvale, CA (US);
Edward R. Zayas, Sunnyvale, CA (US);
Randal Thelen, Sunnyvale, CA (US);
Stephen H. Strange, Sunnyvale, CA (US); Susan M. Coatney, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1245 days.

(21) Appl. No.: 11/738,553

(22) Filed: Apr. 23, 2007

(51) Int. Cl.
*G06F 17/30* (2006.01)
*G06F 3/06* (2006.01)

(52) U.S. Cl.
CPC ...................................... *G06F 3/067* (2013.01)

(58) Field of Classification Search
CPC .................................................... G06F 3/0607
USPC ............................................. 707/1–100, 781
See application file for complete search history.

(56) References Cited

U.S. PATENT DOCUMENTS

| | | | |
|---|---|---|---|
| 5,806,065 | A | 9/1998 | Lomet |
| 5,819,292 | A | 10/1998 | Hitz et al. |
| 5,958,052 | A * | 9/1999 | Bellovin et al. ................. 726/11 |
| 6,671,773 | B2 | 12/2003 | Kazar et al. |
| 6,742,035 | B1 | 5/2004 | Zayas et al. |
| 7,035,931 | B1 | 4/2006 | Zayas et al. |
| 7,107,385 | B2 | 9/2006 | Rajan et al. |
| 7,136,867 | B1 * | 11/2006 | Chatterjee et al. ............ 713/171 |
| 7,424,592 | B1 * | 9/2008 | Karr et al. ...................... 711/203 |
| 2001/0039585 | A1 | 11/2001 | Primak et al. |
| 2002/0078335 | A1 * | 6/2002 | Cabrera et al. ..................... 713/1 |
| 2002/0128995 | A1 | 9/2002 | Muntz et al. |
| 2003/0191810 | A1 * | 10/2003 | Muhlestein et al. .......... 709/215 |
| 2003/0229689 | A1 * | 12/2003 | Raghavan et al. ............ 709/223 |
| 2004/0030668 | A1 | 2/2004 | Pawlowski et al. |
| 2004/0051731 | A1 * | 3/2004 | Chang et al. .................. 345/734 |
| 2004/0205088 | A1 | 10/2004 | Toner |
| 2004/0210672 | A1 | 10/2004 | Pulleyn et al. |
| 2004/0255187 | A1 * | 12/2004 | Gabriel Vecoven ............... 714/6 |
| 2005/0066293 | A1 * | 3/2005 | Hunt ............................. 715/854 |
| 2005/0192932 | A1 | 9/2005 | Kazar et al. |

(Continued)

FOREIGN PATENT DOCUMENTS

EP         1480130 A2     11/2004
WO    WO 2008/066872 A2    6/2008

OTHER PUBLICATIONS

U.S. Appl. No. 11/605,674 for Referent-Controlled Location Resolution of Resources in a Federated Distributed Systems, by Daniel Ellard on Nov. 29, 2006, 29 pages.

(Continued)

*Primary Examiner* — Hosain Alam
*Assistant Examiner* — Navneet K Gmahl
(74) *Attorney, Agent, or Firm* — Kacvinsky Daisak Bluni, PLLC

(57) ABSTRACT

The present invention uniquely names storage devices in a global storage environment with hierarchical storage domains. In particular, according to one or more embodiments of the present invention a storage device (e.g., a disk) is connected at a particular location within the global storage environment. That particular location is associated with a path of each of one or more hierarchical storage domains in which the storage device is located. Accordingly, a name is assigned to the storage device that is the path of the hierarchical storage domains in which the storage device is located.

25 Claims, 7 Drawing Sheets

(56) References Cited

U.S. PATENT DOCUMENTS

| | | | |
|---|---|---|---|
| 2005/0246393 | A1 | 11/2005 | Coates et al. |
| 2005/0262102 | A1 | 11/2005 | Anderson et al. |
| 2006/0080465 | A1* | 4/2006 | Conzola et al. ............... 709/245 |
| 2007/0294388 | A1 | 12/2007 | Yu |
| 2008/0123559 | A1* | 5/2008 | Haviv et al. ................... 370/255 |
| 2010/0115586 | A1* | 5/2010 | Raghavan et al. ................ 726/3 |

OTHER PUBLICATIONS

Kazar et al., "Enabling a Clustered Namespace With Redirection". U.S. Appl. No. 11/499,493, filed Aug. 4, 2006, 43 pages.

Howard et al., "Scale and Performance in a Distributed File System", ACM Transactions on Computer Systems, 6(1), Feb. 1988, pp. 51-81.

Harris, "Novell NetWare 6.5 Administrator's Handbook", Dec. 2, 2003, Novell Press, 3 selected pages.

Braam, Peter J., "The Coda Distributed File System", Linux Journal, vol. 1998, No. 50, 1998, XP002480249, ISSN: 1075-3583, Retrieved from the Internet: <http://delivery.acm.org/10.1145/330000/327403/a6-braam.html?key1=327403&key2=0251480121&col=GUIDE&dl=GUIDE&CFID=5601694&CFTOKEN=91730823>, Retrieved on May 15, 2008.

"Notification of Transmittal of the International Search Report and the Written Opinion of the International Searching Authority, or the Declaration", International Filing Date: Nov. 29, 2007, International Application No. PCT/US2007/024541, Applicant: Network Appliance, Inc., Date of Mailing: May 29, 2008, pp. 1-13.

Shepler et al., "Network File System (NFS) version 4 Protocol", Request for Comments (RFC) 3530, Network Working Group, Apr. 2003, 275 pages.

* cited by examiner

UNIQUELY NAMING STORAGE DEVICES IN A GLOBAL STORAGE ENVIRONMENT

FIELD OF THE INVENTION

The present invention is directed to storage systems and, in particular, to uniquely naming storage devices (e.g., disks) within the global storage environment.

BACKGROUND OF THE INVENTION

A storage system typically comprises one or more storage devices for storing data. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network, and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be configured to operate according to a client/server model of information delivery to thereby allow many clients to access data containers, such as files and logical units, stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and/or block-based protocol messages (in the form of packets) to the storage system over the network.

A plurality of storage systems may be interconnected to provide a storage system cluster configured to service many clients. For instance, in addition to managing/viewing components of a single storage system, clients (users) may be presented with a "global" view and single system image for components (e.g., storage devices, such as disks) of the interconnected storage systems across the cluster. In other words, a global view thus allows users to see and manage the components of interconnected storage systems from anywhere within the cluster. In addition, a plurality of clusters may be further interconnected to provide a federation of clusters to service an even greater number of clients. Such hierarchical groupings may continue to be established (e.g., interconnecting federations, etc.), and any such related storage systems are generally referred to herein as being within a "global storage environment."

One problem that arises due to expanded global storage environments is that the related storage devices within the environment have to be uniquely identifiable within a global view of the environment. For instance, when a storage device is under management by a single storage system, a storage device name may be any configured name that unique within the domain of the storage system. As used herein, the word "domain" refers to a collection of systems that are related. Once a plurality of storage systems are interconnected (e.g., into a cluster), however, a unique storage device name of one storage system may be a duplicate name used for a storage device in another interconnected storage system. Accordingly, when accessing the global view of available storage devices within a cluster, the duplicate names may create a conflict.

One available solution currently utilized for ensuring unique names for storage devices is to provide a centralized database that contains an index/listing of all storage devices of a particular storage environment (e.g., a cluster and/or federation, etc.). In this manner, when a storage device is named (e.g., dynamically or manually by an administrator), the centralized database may be used to determine whether any naming conflicts exist. According to one centralized database technique, a conflicted name may produce an error, thus prohibiting the duplicate name. Alternatively, in another centralized database technique, the duplicate names are allowed, but each time an access to a duplicate named storage device is attempted, the centralized database must be used to determine which of the duplicate storage devices should be accessed. Such centralized database techniques are not particularly easy to implement, especially as the storage environments continue to grow and greater numbers of storage devices must be maintained.

Internally, many storage devices may have world-wide unique identifications (IDs). However these unique IDs are often long and complex (e.g., 40-128 bytes long). As will be appreciated by those skilled in the art, such IDs may only be well suited for internal use (e.g., for software processes). Conversely, the length and possible complexity of the IDs (e.g., a string of bits or alphanumeric code) renders use of such IDs generally unsuitable for external customers (e.g., clients/users). In other words, when a client accesses a global view of the storage devices within the storage environment, and/or when utilizing the storage device names in command line interfaces (CLIs) or graphical user interfaces (GUIs), such long and complex names may be difficult to manage and maintain. In particular, where the internal IDs are unique strings of bits or alphanumeric characters, those IDs offer a client/user no meaningful mnemonic to distinguish storage devices or to recall a storage device's location within the global storage environment. For instance, in an interconnected storage environment, storage devices may be relocated within the environment, such that keeping track of the locations of the potentially large number of storage devices becomes increasingly difficult with more complex unique IDs (e.g., unique yet cumbersome storage device names).

There remains a need, therefore, for a technique for naming storage devices (e.g., disks) of a global storage environment that produces names that are not only unique within the entire storage environment, but that are human-readable and user-friendly. In particular, there remains a need for a technique for naming storage devices that is consistent among nodes of the storage environment, and is persistent (e.g., not changing between reboots or upgrades), and that does not require the use of a centralized database to maintain the storage device names.

SUMMARY OF THE INVENTION

The present invention overcomes the disadvantages of the prior art by providing a technique for uniquely naming storage devices in a global storage environment with hierarchical storage domains. In particular, according to one or more embodiments of the present invention, a storage device (e.g., a disk) is connected at a particular location within the global storage environment. That particular location is associated with a path of each of one or more hierarchical storage domains in which the storage device is located (that is, the storage device may be organized within one or more groupings of storage domains, each of which may be further grouped into other storage domains, etc.). Accordingly, a name is assigned to the storage device that is the path of the hierarchical storage domains in which the storage device is located. For example, if a disk is located as part of a particular storage system, which is part of a particular group (cluster) of storage systems, the name assigned to the disk may reference the particular group, storage system, and a local name for the disk within its storage system.

According to one or more embodiments of the present invention, additional (or fewer) hierarchical storage domains may be utilized within the global storage environment, and such domains may be included within the storage device name. For instance, hierarchically higher domains may be added, such as groups of clusters (e.g., federations), as well as hierarchically lower domains, such as partitions of a storage device (e.g., logical unit numbers, or luns). Also, intermediate hierarchical domains may be added, such as storage switches between the storage systems and the storage devices. That is, each storage domain in which the storage device is located (i.e., along the path to the storage device or portion of the storage device) may be used in the name assigned to the device. Further, in the event a storage device is relocated to a different (new) location, a new name may correspondingly be assigned based on the new location.

Advantageously, the novel technique uniquely names storage devices in a global storage environment with hierarchical storage domains. By assigning names to storage devices that comprise their path of the hierarchical domains, the novel technique assures that no duplicate storage device names are established, since no two storage devices are located at the same location. Also, the hierarchical domain paths may be generally human-readable and user-friendly, and provide substantial insight for a client/user to the location of the storage device within the global storage environment (e.g., even when the storage device changes location). In addition, storage device names are consistent among nodes of the storage environment and persistent (e.g., not changing between reboots or upgrades), and do not require the use of a centralized database to maintain the storage device names.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF ILLUSTRATIVE EMBODIMENTS

A. Storage Environment

Figure 1:
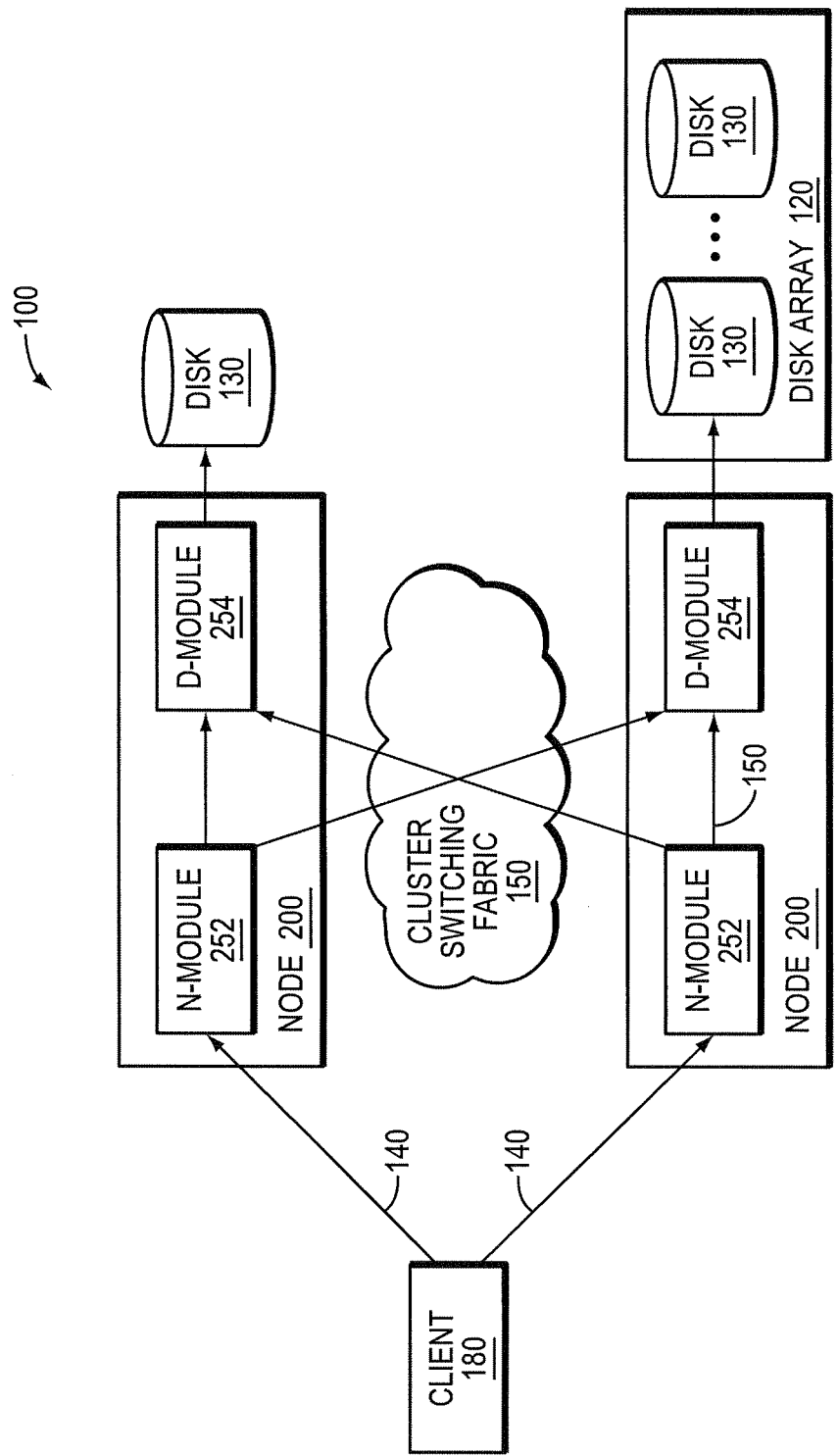
FIG. 1 is a schematic block diagram of a plurality of nodes interconnected as a cluster in accordance with one or more embodiments of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 252) and a disk element (D-module 254). The N-module 253 includes functionality that enables the node 200 to connect to clients 180 over a computer network 140, while each D-module 254 connects to one or more storage devices, such as disks 130 of a disk array 120. Notably, while D-modules 254 are illustratively shown interconnected to either a disk 130 or a disk array 120, embodiments of the present invention may comprise D-modules interconnect to disks 130, disk arrays 120, storage fabrics (not shown) providing access to disks or disk arrays, etc. The view shown herein, therefore, is meant to be taken merely as a representative example.

The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al. issued on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Nodes

Figure 2:
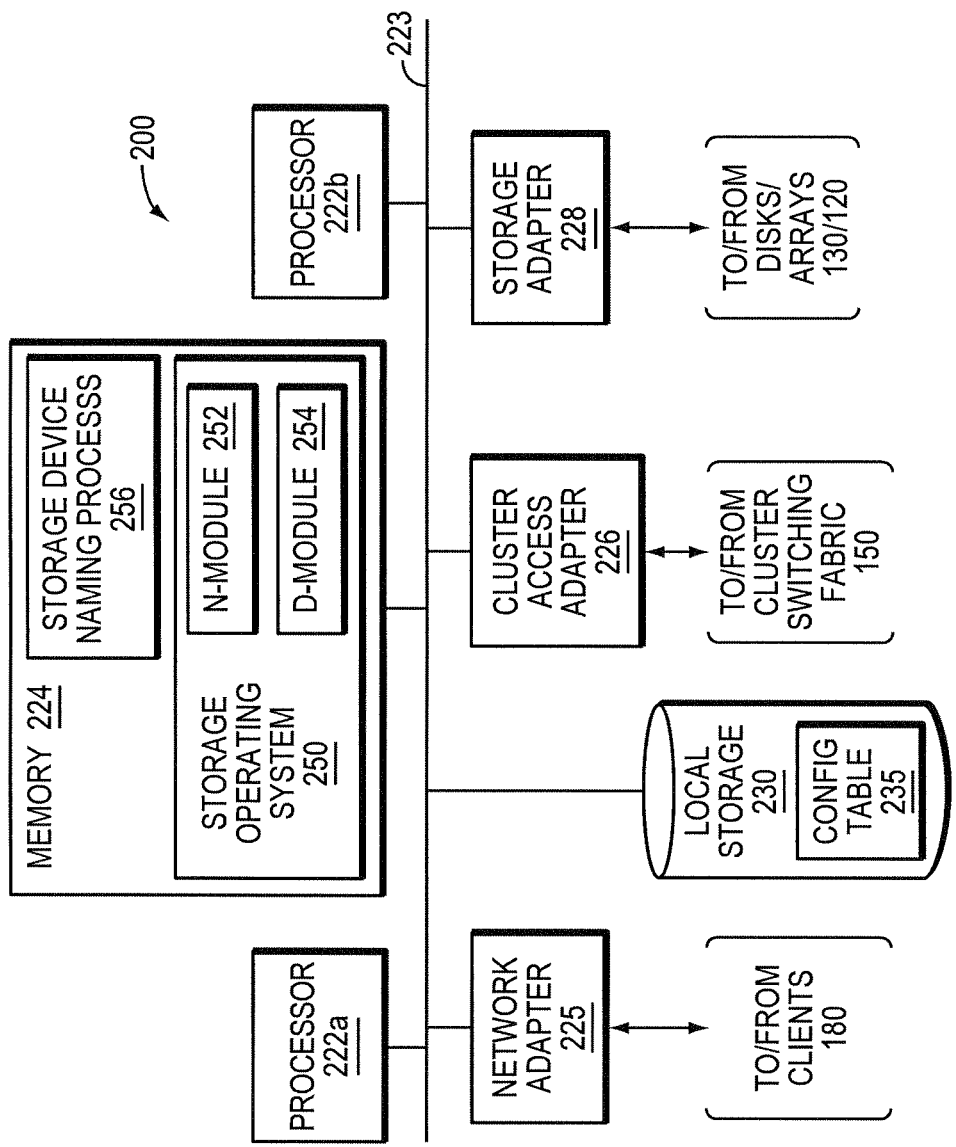
FIG. 2 is a schematic block diagram of a node in accordance with one or more embodiments of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 250 that preferably implements a high-level module, such as a file system, to logically organize the information as a hierarchical structure of named directories, files, and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 252 on the node, while the other processor 222b executes the functions of the D-module 254.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 250, portions of which is typically resident in memory and executed by the processing elements, functionally organizes the node 200 by, inter alia, invoking storage operations in support of the software processors and/or services implemented by the node. These processes may comprise, for example, a storage device naming process 256, described herein. It will be apparent to those skilled in the art that other processing and memory means, including various computer readable media, may be used for storing and executing program instructions pertaining to the invention described herein.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. Where the term "WAFL" is employed, it should be taken broadly to refer to any file system that is otherwise adaptable to the teachings of this invention.

The network adapter 225 comprises a plurality of ports adapted to couple the node 200 to one or more users/clients 180 over point-to-point links, wide area networks, virtual private networks implemented over a public network (Internet) or a shared local area network. The network adapter 225 thus may comprise the mechanical, electrical, and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 250 executing on the node 200 to access information requested by the clients. The information may be stored on any type of attached array of writable storage device media such as video tape, optical, DVD, magnetic tape, bubble memory, electronic random access memory, micro-electro mechanical, and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology. For instance, the storage adapter 228 may service one or more storage "loops", where any device (e.g., storage devices 130 or other nodes 200, etc.) attached to the same loop is able to see any messages transmitted over that loop, as will be understood by those skilled in the art. Accordingly, each device on the loop may have a distinguishing loop identification (loop ID) in order to determine for which device on the loop the messages are intended. For example, a node 200 may have a particular storage adapter 228 (e.g., identified by the node 200 as a label "a") configured to service one or more loops, one of which is labeled loop "4". As such, to specifically address a particular device on loop label "4" (e.g., a particular disk 130 of array 120), a corresponding loop ID of the device must be used (e.g., loop ID "45" for the particular disk 130).

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In the illustrative embodiment, the storage operating system 250 may be embodied partly as a D-module (storage server) 254 to service one or more storage devices (volumes/disks) of array 120. In addition, the storage operating system 250 may be also embodied partly as an N-module (multi-protocol engine) 252 to (i) perform protocol termination with respect to a client issuing incoming data access request packets over the network 140, as well as (ii) redirect those data access requests to any storage server (D-module 254) of the cluster 100. Moreover, the N-module 252 and D-module 254 cooperate to provide a highly-scalable, distributed storage system architecture of the cluster 100. To that end, each module includes a cluster fabric (CF) interface module (not shown, e.g., in conjunction with cluster access adapter 226) adapted to implement intra-cluster communication among the modules, including D-module-to-D-module communication for, e.g., data container striping operations.

Notably, the N-module 252 functions to translate file-based and block-based data access requests from clients into CF protocol messages used for communication with the D-modules 254. That is, the N-module servers convert the incoming data access requests into file system operations (commands) that are embedded within CF messages for transmission to the D-modules 254 of the cluster 100. Notably, the CF interface (cluster switching fabric 150) may be used to provide a single file system image across all D-modules 254 in the cluster 100. Thus, any network port of an N-module that receives a client request can access any data container (i.e., any storage device/disk 130) within the single file system image located on any D-module 254 of the cluster.

Further to the illustrative embodiment, the N-module 252 and D-module 254 are implemented as separately-scheduled processes of storage operating system 250; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. For example, a known message-passing mechanism provided by the storage operating system to transfer information between modules (processes) is the Inter Process Communication (IPC) mechanism.

C. Storage Device Naming

The present invention overcomes the disadvantages of the prior art by providing a technique for uniquely naming storage devices in a global storage environment with hierarchical storage domains. In particular, according to one or more embodiments of the present invention a storage device (e.g., a disk) is connected at a particular location within the global storage environment. That particular location is associated with a path of each of one or more hierarchical storage domains in which the storage device is located. Accordingly, a name is assigned to the storage device that is the path of the hierarchical storage domains in which the storage device is located.

Figure 3:
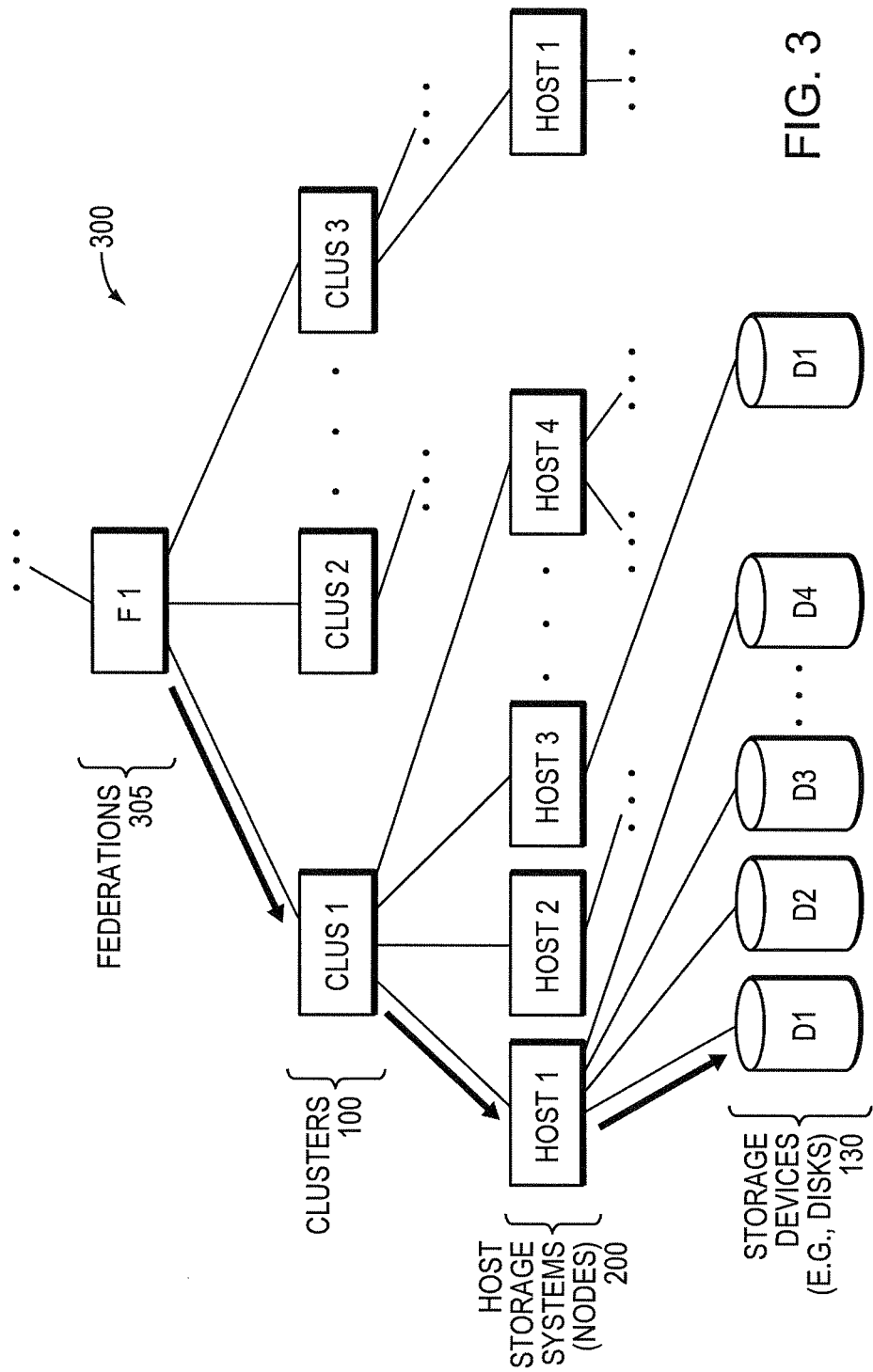
FIG. 3 is a schematic block diagram of an example hierarchical topology of a global storage environment in accordance with one or more embodiments of the present invention.

Illustratively, FIG. 3 is a schematic block diagram of an example hierarchical topology of a global storage environment 300 in accordance with one or more embodiments of the present invention. Accordingly, the topology of the global storage environment 300 may be viewed as a tree based structure, where each node of the tree corresponds to an hierarchical "domain", and leaves of the tree correspond to storage devices (e.g., disks) 130 to be named. As noted, the term "domain" refers to a collection of systems that are related. For example, one or more storage devices 130 (e.g., D1, D2, D3, and D4) may be grouped and controlled/managed by a host storage system (node 200, e.g., Host1), i.e., a host storage system domain. Also, one or more host storage systems (nodes 200, e.g., Host1, Host2, Host3, and Host4) may be grouped into a cluster 100 (e.g., Clus1), i.e., a cluster domain. Further, one or more clusters 100 (e.g., Clus1, Clus2, and Clus3) may be grouped into a federation 305 (e.g., F1), i.e., a federation domain. In other words, a global storage environment 300 may be viewed as an hierarchical arrangement, where hierarchically higher groupings or domains (e.g., clusters) may be divided into hierarchically lower domains (e.g., host storage systems). Stated differently, hierarchically lower domains may be grouped into hierarchically higher domains. Notably, while the present invention is described in terms of a particular illustrative hierarchical topology, hierarchical domains other than those specifically mentioned herein may be utilized accordingly. (Moreover, an example illustrative hierarchical topology, and particularly federations of grouped clusters, is described in commonly-owned, copending U.S. patent application Ser. No. 11/605,674, entitled REFERENT-CONTROLLED LOCATION RESOLUTION OF RESOURCES IN A FEDERATED DISTRIBUTED SYSTEMS, by Daniel Ellard on Nov. 29, 2006, which was published as U.S. Patent Publication No. 2008/0126369 on May 29, 2008.)

Operationally, when a storage device (e.g., a disk) 130 (e.g., D1) is connected at a particular location within the global storage environment 300, the storage device naming process 256 (or a manually configuring administrator) of a locally attached host storage system (e.g., Host1) determines an associated hierarchical domain path for the particular location. That is, each of one or more hierarchical storage domains in which the storage device is located is included with the hierarchical domain path to reach the storage device, e.g., from the highest hierarchical domain (illustratively, a federation 305). For instance, an illustrative hierarchical domain path template for the topology 300 may comprise: Federation_Name: Cluster_Name: Host_Storage_System_Name: Local_Storage_Device_Name. For example, for storage device D1 of the shown environment, an hierarchical domain path from the uppermost domain to the storage device itself may be illustratively represented as "F1:Clus1:Host1:D1". This hierarchical domain path to storage device D1 provides a unique path to the storage device, and according to one or more embodiments of the present invention, is the name assigned to the storage device (D1). Accordingly, a fully qualified name (that is, a storage device name that is entirely unique for the global storage environment by including each and every domain of the environment in which the storage device is located) for storage device D1 of the shown environment 300 would thus be: "F1:Clus1:Host1:D1".

In particular, this hierarchically layered naming scheme ensures that no duplicate storage device names are present within the entire global storage environment 300. That is, because storage device naming process 256 of each host storage system 200 names storage devices based on their locations, and because no two storage devices may be located at the same location, the storage system names are unique. For instance, if host storage system Host3 also has a disk named "D1", there is no conflict with "D1" of Host1 because the fully qualified names would be distinguishable as "F1:Clus1:Host3:D1" and "F1:Clus1:Host1:D1", respectively. The same distinguishing aspect of the naming scheme of the present invention is available at each hierarchical domain level, such as if cluster Clus3 also comprises a host storage system Host1, storage devices of the two similarly named host storage devices are distinguishable by their fully qualified names, e.g., "F1.Clus1.Host1.D1" and "F1.Clus3.Host1.D1". Accordingly, then, a client 180 may access the global storage environment from any location, and may access/manage the storage devices using their globally unique names.

Notably, in accordance with an aspect of the present invention, local storage device names (e.g., "D1") may comprise, more specifically, a location of the local storage device with regards to its own (managing/maintaining) host storage system. For instance, assume that host storage system Host1 has a storage adapter 228 labeled internally as "a", which services one or more storage loops, such as loop "4", as mentioned above. If storage device D1 (e.g., a disk 130) is located in slot "45" (that is, has a loop ID of "45") on loop "4", a local storage device name may more specifically comprise a format of: "host_adapter.loopID", or, as an illustrative example, "4a.45". In this manner, an illustrative fully qualified name may be: "F1:Clus1:Host1:4a.45".

Those skilled in the art may appreciate that the storage device names are not only globally unique, but provide the location of the storage device, as well. For instance, for this reason, the (user-friendly) fully qualified names may be easy to remember (or to figure out), and in reverse, may help an administrator to physically locate the storage device. Moreover, because the unique names are the locations of the storage devices, the names do not need to be stored (persisted) on the storage device, or necessarily anywhere (e.g., at the host storage systems). Specifically, that is, because the storage device names represent their locations, the names are consistent (i.e., do not change from reboots and/or upgrades), and by using the hierarchical domain path as a name, simply knowing the path to the disk provides a storage system with the name of the storage device. For example, if a storage system wishes to access a storage device located within federation F1, cluster Clus1, host storage system Host1, with a local storage device name (e.g., its location from Host1) of "D1" (e.g., "4a.45"), then the accessing storage system may, without having to determine a name for the storage device, access the storage device based on a name established (e.g., on the fly) using the technique described herein, for example, "F1:Clus1:Host1:D1".

Figure 4:
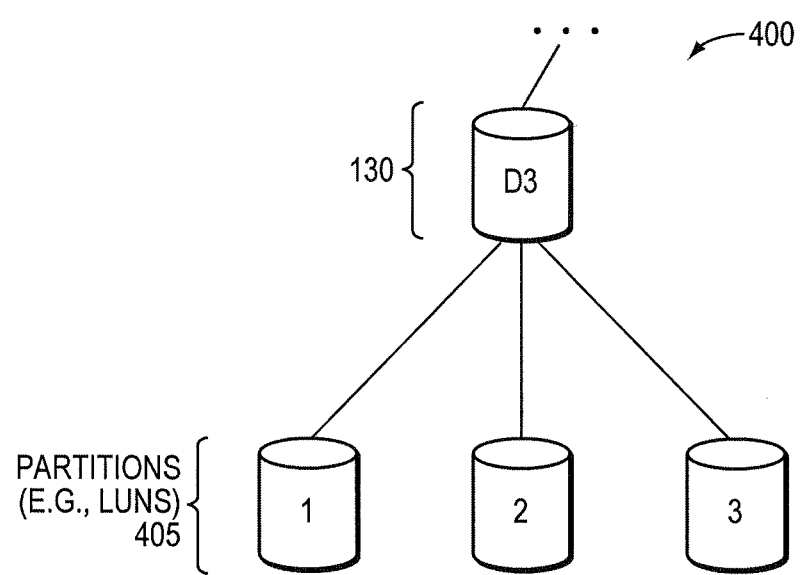
FIG. 4 is a schematic block diagram of an example (abbreviated) hierarchical topology showing a storage device having one or more hierarchically lower domains in accordance with one or more embodiments of the present invention.

Further, in accordance with the present invention, hierarchically lower domains, such as portions of a storage device, may also be added to the hierarchical domain path. For example, logical unit numbers (luns) may be used to refer to a single storage device, a subset (portion/partition) of a single storage device, or an array of devices (or a virtual disk exported by a storage system) that may be accessed by clients 180 using block-based protocols. In particular, in accordance with the present invention where a lun is a subset of a single storage device, those subsets may be represented within the global storage environment (a domain within hierarchical topology 300) as an hierarchically lower domain than the storage devices. FIG. 4 illustrates an example (abbreviated) hierarchical topology 400 showing a storage device (e.g., D3) having one or more hierarchically lower domains 405, such as storage device partitions or luns (e.g., 1, 2, and 3). In accordance with one or more embodiments of the present invention, the additional (more granular) domain may be represented within the hierarchical domain path as either a subset of the local name (e.g., " . . . Host1:D3.L1" for lun L1 of storage device D3, or, illustratively, " . . . Host1:4a.15L1") or as a further domain of the path (e.g., " . . . Host1:D3:L1" or " . . . Host1:4a.15:L1"). Notably, while luns are used and described herein as portions of storage units, other subsets and storage device divisions may be used in accordance with the present invention. Thus, the term "lun" as used herein may refer to any storage device partition accordingly.

Figure 5:
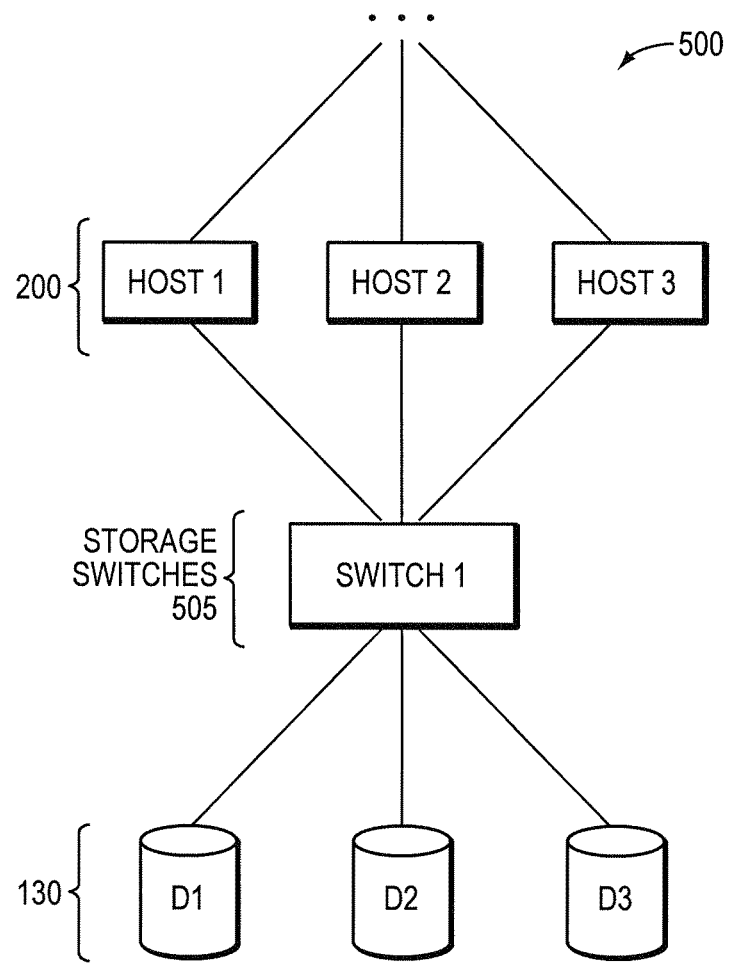
FIG. 5 is a schematic block diagram of an example (abbreviated) hierarchical topology showing host storage systems interconnected to shared storage devices by an intermediate storage switch in accordance with one or more embodiments of the present invention.

In addition, intermediate hierarchical domains may be added to the name of the storage device, such as storage switches between the storage systems and the storage devices. FIG. 5 illustrates an example (abbreviated) hierarchical topology 500 showing host storage systems (e.g., Host1, Host2, and Host3) interconnected to shared storage devices (e.g., D1, D2, and D3) by an intermediate storage switch domain 505 (e.g., Switch1). Storage switches, generally, allow one or more host storage systems to communicate with and share one or more storage devices. For instance, while cluster switching fabric 150 in FIG. 1 allows a plurality of nodes 200 to communicate with one another, a storage switch may act as a link between the nodes 200 and the one or more storage devices (e.g., disks) 130, as will be understood by those skilled in the art. As such, in storage environments where this intermediate hierarchical domain may be present, an additional domain may be inserted into the hierarchal domain path, such as, ". . . Host_Storage_System:Storage_Switch:Local_Storage_Device_Name". For example, instead of " . . . Host1:D1", the addition of a switch may result in an assigned name of " . . . Host1:Switch1:D1".

Also, as described above, the local storage device name (e.g., D1) may be more specifically represented by its location with regards to its host storage system. In the event a switch is used, however, the more specific local storage device name may be represented by its location with regards to its locally attached switch. For instance, a more specific format of the local storage device name may be: "switch_port.loopID", as opposed to "host_adapter.loopID". In other words, the more specific local storage system name may correlate to its connection to the switch, and not to any host storage system, accordingly. Those skilled in the art will appreciate that while switches are used herein as an illustrative intermediate hierarchical domain, other intermediate hierarchical domains may be used in accordance with one or more embodiments described herein, and switches are merely one representative example.

In accordance with an aspect of the present invention, a storage device may be relocated (moved) to a different (new) location within the global storage environment 300. Accordingly, a new name may be correspondingly assigned to the storage device based on that new location. For example, if storage device D2 is relocated from host storage system Host1 to host storage system Host2, its name may therefore illustratively be reassigned from "F1:Clus1:Host1:D2" to "F1:Clus1:Host2:D2". (For instance, such a renaming may be performed dynamically by storage device naming process 256 of Host2, or manually by a system administrator following the novel technique in accordance with the present invention.)

More subtly (and specifically), a storage device need not change locations physically, but various configurations of its current host storage system may change in a manner that "relocates" the storage device. For instance, by rewiring and/or reconfiguring connectivity between host storage adapters 228 and storage devices 130, such as changing loops, loop IDs, adapter labels, adapters, etc., whether physically reconnecting devices or reconfiguring the paths (e.g., in software configurations), the location of the storage device may be changed. As such, a new name may be assigned (e.g., from abbreviated " . . . Host1:4a.45" to " . . . Host1:3a.15").

Also, in accordance with another aspect of the present invention, non-fully qualified (e.g., abbreviated) names may be used to refer to storage devices within or below a local domain utilizing the name. That is, only a portion of the hierarchical domain path that is below an accessing domain need be utilized to determine a path to a storage device hierarchically below the accessing domain. As such, only that portion of the path, and thus of the fully qualified name, need be utilized to access the storage device. For instance, a host storage system Host1 may use a shortened version of the fully qualified storage device name for storage devices under the control of (i.e., of a lower hierarchical domain than) Host1. For example, the local storage device name "D1" (or "4a.45") from Host1 may be used as a short (abbreviated) name for "F1:Clus1:Host1:D1", particularly, because from within the host storage system Host1, there is only one storage device "D1". Also, for additional illustrative purposes, a client 180 operating within the domain of cluster Clus1 may use a non-fully qualified name for "F1:Clus1:Host1:D1" that is simply "Host1:D1", since from within cluster Clus1, there is only one Host1 (and thus one "Host1:D1").

Figure 6:
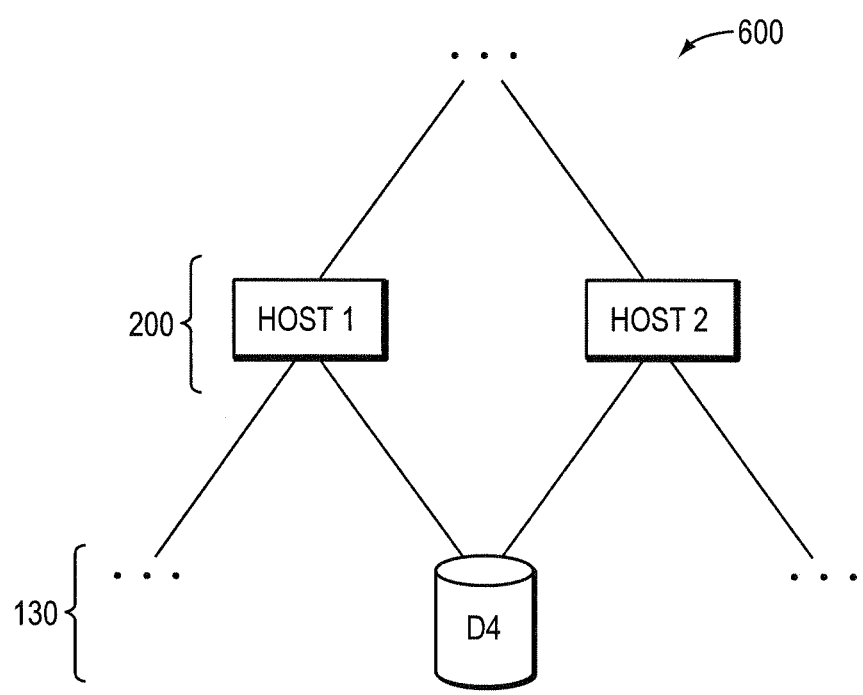
FIG. 6 is a schematic block diagram of an example (abbreviated) hierarchical topology showing a multi-attached storage device, with connections to multiple host storage systems in accordance with one or more embodiments of the present invention.

Notably, there are occasions/configurations where a storage device may have multiple paths from multiple host storage systems (e.g., to prevent a single point failure), as will be understood by those skilled in the art. FIG. 6 illustrates an example (abbreviated) hierarchical topology 600 showing a multi-attached storage device "D4", with connections to both host storage system Host1 and host storage system Host2, as shown. Accordingly, because the storage device D4 is located within multiple (e.g., two) distinct domains (for Host1 and Host2), the storage device may be assigned multiple corresponding names, i.e., one for each hierarchical domain path. (For instance, as those skilled in the art will appreciate, these multiple names for the same storage device may function in a manner similar to multiple Internet addresses to reach a single node through multiple diverse networks.)

For example, assuming that Host1 and Host2 are in the same cluster domain (Clus1), illustrative abbreviated names for the storage device D4 may be "Host1:D4" and "Host2:D4". More specifically, as mentioned above, if the storage device D4 is located on a different loop for each host storage system, then different local storage device names may be utilized (e.g., "Host1:3a.42" and "Host2:4b.15"). If, on the other hand, the storage device D4 is located on the same loop for each host storage system (i.e., the illustrative host storage systems are also on the same loop), the same loop and loop ID may be used to identify the storage device (e.g., "Host1:3a.42" and "Host2:3b.42"). Note that the host storage systems may identify the same loop ("3"), but each host adapter 228 may have (though not necessarily) different adapter labels (e.g., "a" and "b", respectively).

Figure 7:
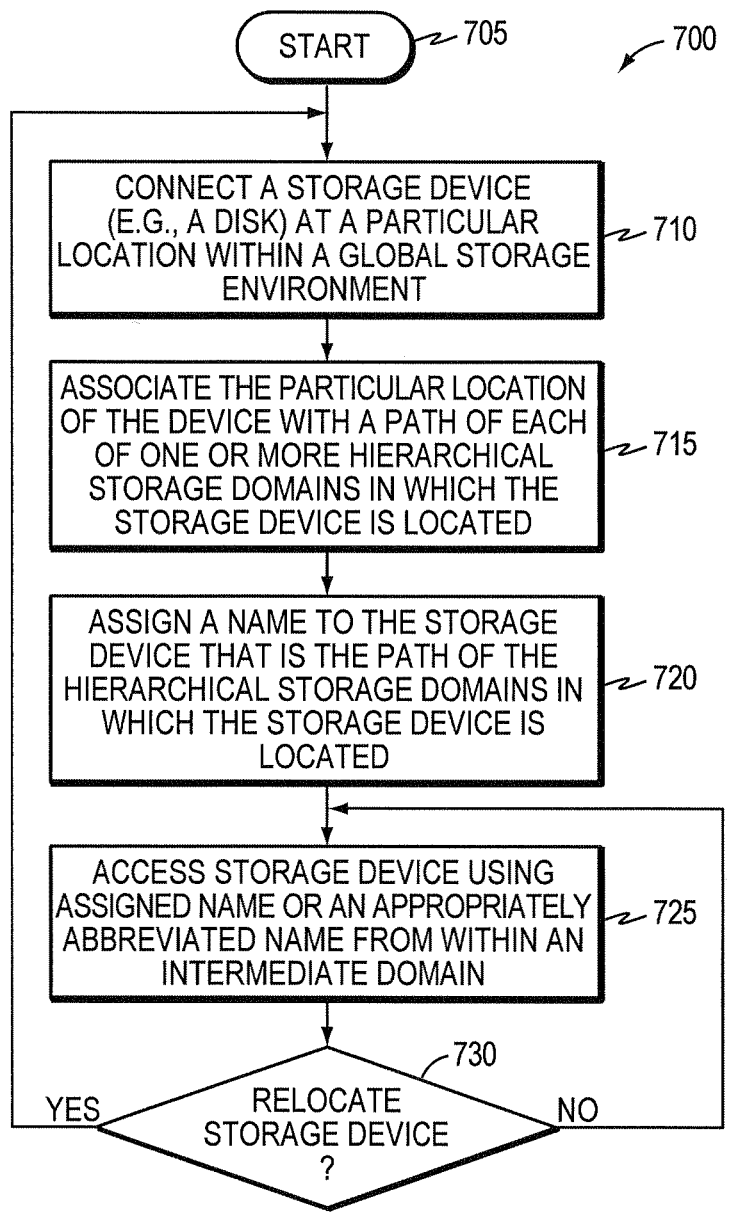
FIG. 7 is a flowchart detailing the steps of a procedure for naming storage devices in a global storage environment with hierarchical storage domains in accordance with one or more embodiments of the present invention.

FIG. 7 is a flowchart detailing the steps of a procedure 700 for naming storage devices in a global storage environment with hierarchical storage domains in accordance with one or more embodiments of the present invention. The procedure starts in step 705 and continues to step 710 where a storage device (e.g., a disk 130) is connected at a particular location within a global storage environment 300. In step 715, the particular location of the device is associated with a path of each of one or more hierarchical storage domains in which the storage device is located. For example, storage device D1 may be connected to host storage system Host1 of cluster Clus1 as part of a federation F1, as described above. As such, the hierarchical domain path for the storage device would be F1:Clus1:Host1:D1. Other hierarchical domains may be present in the path, such as switches (e.g., F1:Clus1:Host1:Switch1:D1), etc.

In step 720, a name is assigned to the connected storage device (e.g., by storage device naming process 256 or by manual configuration) that is the path of the hierarchical storage domains in which the storage device is located, e.g., "F1:Clus1:Host1:D1". Notably, as described above, the local storage device name "D1" may comprise host adapter locations and loop IDs (e.g., "4a.15"), and may also comprise lun notations as well (e.g., "4a.15L3"). Once the storage device is named, a client/user 180 may access the storage device in step 725 using the assigned name or an appropriately abbreviated name from within an intermediate domain, as mentioned above (e.g., "Host1:D1" from within cluster Clus1). In the event the storage device is relocated in step 730, such as to a new particular location, the procedure 700 returns to step 710 to connect the storage device and rename the device according to the new location (i.e., the new hierarchical domain path). If the storage device is not relocated in step 730, then a client/user may continue to access the device in step 725 accordingly (that is, until failure or removal of the storage device from the global storage environment 300).

Advantageously, the novel technique uniquely names storage devices in a global storage environment with hierarchical storage domains. By assigning names to storage devices that comprise their paths of the hierarchical domains, the novel technique assures that no duplicate storage device names are established, since no two storage devices are located at the same location. Also, the hierarchical domain paths may be generally human-readable and user-friendly, and provide substantial insight for a client/user to the location of the storage device within the global storage environment (e.g., even when the storage device changes location). In addition, storage device names are consistent among nodes of the storage environment and persistent (e.g., not changing between reboots or upgrades), and do not require the use of a centralized database to maintain the storage device names.

While there have been shown and described illustrative embodiments for uniquely naming storage devices in a global storage environment with hierarchical storage domains, it is to be understood that various other adaptations and modifications may be made within the spirit and scope of the present invention. For example, the embodiments have been shown and described herein with/using clustered storage systems, particularly network elements and disk elements and the associated cluster interface. However, the embodiments of the invention in its broader sense are not so limited, and may, in fact, be used with any devices/nodes that operate in a similarly applicable manner to provide global access to storage devices of a storage environment. Also, while the above description illustratively describes particular domains (e.g., clusters, federations, etc.), those skilled in the art will understand that other hierarchical domains may be used for the naming technique in accordance with the present invention.

Notably, in the event there are storage systems within the global storage environment 300 that do not support hierarchical domain path naming in accordance with the present invention, the local storage system naming scheme described above (e.g., "4a.45") may still be advantageously utilized. As such, a centralized database (not shown) may still be used for those storage systems and their associated storage devices accordingly.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes, and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for uniquely naming storage devices in a global storage environment, comprising:
   interconnecting a plurality of storage systems into the global storage environment;
   connecting a storage device to one or more storage systems at a location within the global storage environment, the location associated with a path of one or more hierarchical storage domains in which the storage device is located, wherein the one or more hierarchical storage domains include a federation domain including a plurality of clusters domains, the plurality of cluster domains including a plurality of host storage system domains; and
   assigning, in response to connecting the storage device at the location within the global storage environment, a name to the storage device that is the path of the one or more hierarchical storage domains in the global storage environment, wherein the name assigned to the storage device is unique to the storage device, the assigned name including at least a first identification of the federation domain in which the storage device is located, a second identification of a cluster domain in which the storage device is located, a third identification of a host storage system domain associated with a host storage system managing the storage device, and a fourth identification associated with the storage device, wherein the global storage environment is organized as a tree like structure and the federation domain is closer to a root of the tree like structure than the cluster domains and the storage system domains.

2. The method as in claim 1, wherein the one or more hierarchical storage domains further include at least one of a global domain, a storage switch domain, a local storage device domain, and a local storage device partition domain.

3. The method as in claim 2, wherein the local storage device partition domain comprises one or more logical unit numbers (luns).

4. The method as in claim 1, further comprising:
   relocating the storage device to a different location in the global storage environment; and
   reassigning a different name to the storage device that is a second path of a plurality of domains to the different location.

5. The method as in claim 4, wherein relocating comprises reconfiguring one or more connections associated with the storage device, wherein a physical location of the storage device remains unchanged.

6. The method as in claim 1, wherein the path of the one or more hierarchical storage domains comprises a host storage system domain and a hierarchically lower local storage device domain.

7. The method as in claim 1, wherein the fourth identification associated with the storage device comprises a loop on which the storage device is located and an associated loop identification (loop ID) for the storage device on the loop.

8. The method as in claim 1, wherein the fourth identification associated with the storage device comprises a host adapter of the host storage system interconnected with the storage device.

9. The method as in claim 1, wherein the path of the one or more hierarchical storage domains comprises the cluster domain that is closer to the root than the host storage system domain.

10. The method as in claim 6, wherein the path of the one or more hierarchical storage domains further comprises a storage switch domain that is hierarchically between the host storage system domain and the local storage device domain.

11. The method as in claim 1, wherein the name assigned to the storage device further comprises a switch identification of a first storage switch behind which the storage device is located.

12. The method as in claim 1, further comprising:
    wherein the location is associated with a plurality of paths in the global storage environment; and
    assigning a plurality of names to the storage device that correspond to the plurality of paths.

13. A computer system configured to uniquely name storage devices in a global storage environment, comprising:
    one or more communication links configured to communicate with one or more storage devices in the global storage environment having a plurality of domains;
    one or more processors coupled to the one or more communication links and configured to execute a storage device naming process; and
    a memory configured to store the storage device naming process, the storage device naming process, when executed, configured to:
    determine a location of a storage device of the one or more storage devices in the global storage environment, the location associated with a path of domains, of the plurality of domains of the global storage environment, in which the storage device is located, wherein the domains include a federation domain including a plurality of clusters domains, the plurality of cluster domains including a plurality of host storage system domains, and
    assign, in response to connecting the storage device at a the location within the global storage environment, a name to the storage device that is the path of domains in the global storage environment, wherein the name assigned to the storage device is unique and includes at least a first identification of the federation domain in which the storage device is located, a second identification of a cluster domain in which the storage device is located, a third identification of a host storage system domain associated with a host storage system managing the storage device, and a fourth identification associated with the storage device, wherein the global storage environment is organized as a tree like structure and the federation domain is closer to a root of the tree like structure than the cluster domains and the storage system domains.

14. The computer system as in claim 13, wherein the storage device naming process, when executed, is further configured to:
    determine that the storage device has been relocated to a different location in the global storage environment; and
    reassign a different name to the storage device that is a second path of domains to the different location.

15. A non-transitory computer-readable storage medium containing executable program instructions for execution by a processor, comprising:
    program instructions that interconnect a plurality of storage systems into a global storage environment;
    program instructions that connect a storage device to one or more storage systems at a location within the global storage environment, the location associated with a path of one or more hierarchical storage domains in which the storage device is located, wherein the one or more hierarchical storage domains include a federation domain including a plurality of cluster domains, the plurality of cluster domains including a plurality of host storage system domains; and program instructions that assign, in response to connecting the storage device at the location within the global storage environment, a name to the storage device of the path of one or more hierarchical storage domains in the global storage environment, wherein the name assigned to the storage device is unique and includes at least a first identification of the federation domain in which the storage device is located, a second identification of a cluster domain in which the storage device is located, a third identification of a host storage system domain associated with a host storage system managing the storage device, and a fourth identification is associated with the storage device, wherein the global storage environment is organized as a tree like structure and the federation domain is closer to a root of the tree like structure than the cluster domains and the storage system domains.

16. A storage system apparatus, comprising:

an adapter configured to interconnect a plurality of storage systems into a global storage environment, the global storage environment including a tree based structure having a plurality of nodes corresponding to a plurality of hierarchical domains within the global storage environment, wherein the plurality of hierarchical domains include a federation domain including a plurality of cluster domains, the plurality of cluster domains including a plurality of host storage system domains, and wherein each node includes a node name;

the adapter further configured to connect a storage device of the plurality of storage devices to a first node in the global storage environment, the first node associated with a path through a hierarchy of nodes of the global storage environment from a highest node through one or more intermediate nodes to the first node, the path identified by a sequence of node names associated with the highest node, the one or more intermediate nodes, and the first node; and a processor configured to execute an operating system of the storage system apparatus, the operating system configured to assign a name to the storage device that is the path through the hierarchy of nodes from the highest node through the one or more intermediate nodes to the first node, wherein the name assigned to the storage device is unique and includes at least a first identification of the federation domain in which the storage device is located, a second identification of a cluster domain in which the storage device is located, a third identification of a host storage system domain associated with a host storage system managing the storage device, and a fourth identification associated with the storage device, wherein the global storage environment is organized as a tree like structure and the federation domain is closer to a root of the tree like structure than the cluster domains and the storage system domains.

17. The method as in claim 1, wherein the storage device comprises an electronic random access memory.

18. The method as in claim 1, wherein the storage device comprises an optical memory.

19. The method as in claim 1, wherein the storage device comprises a storage disk.

20. The method as in claim 1, wherein the storage device comprises a RAID array.

21. The computer system as in claim 13, wherein the storage device comprises an electronic random access memory.

22. The apparatus as in claim 16, wherein the storage device comprises an optical memory.

23. The apparatus as in claim 16, wherein the storage device comprises a storage disk.

24. The apparatus as in claim 16, wherein the storage device comprises a RAID array.

25. The method as in claim 1, wherein assigning the name to the storage device is performed by the host storage system.

* * * * *